UNITED STATES PATENT OFFICE.

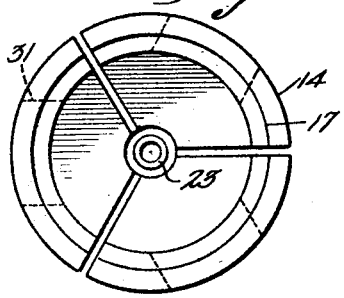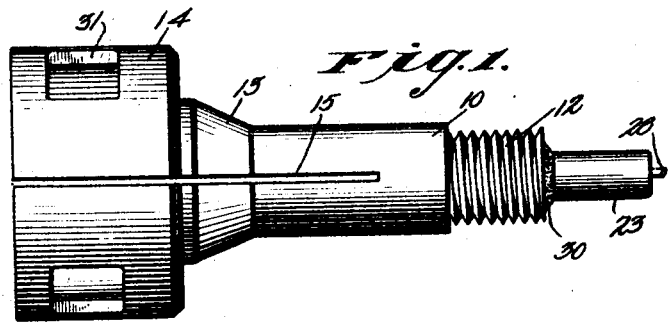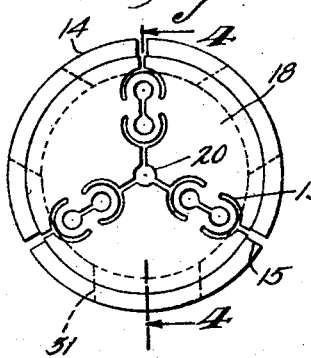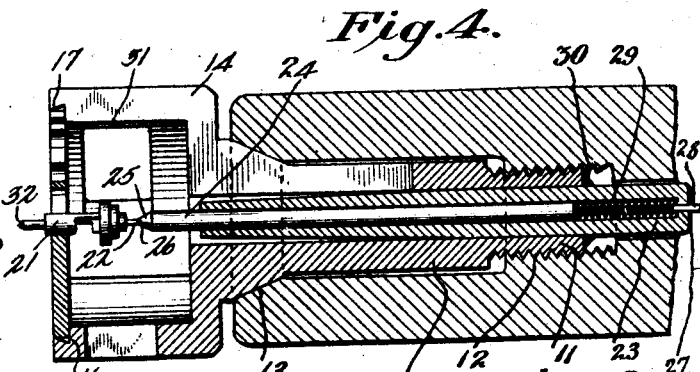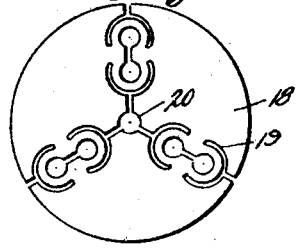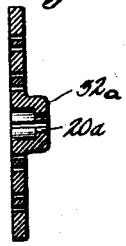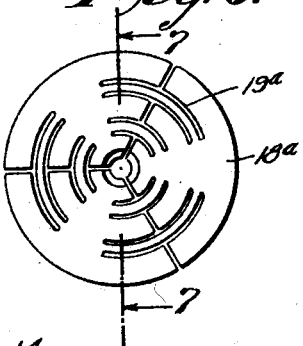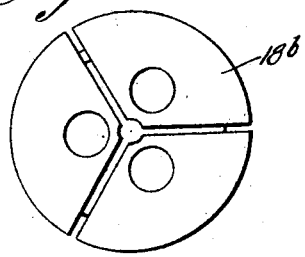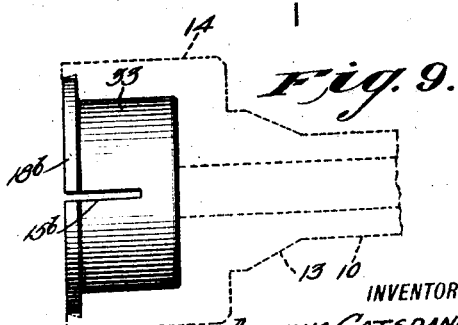

ABRAHAM GOTSDANKER, OF BROOKLYN, NEW YORK.

WATCHMAKER'S COMPOUND LATHE CHUCK.

1,411,082.  Specification of Letters Patent.  Patented Mar. 28, 1922.

Application filed March 10, 1920. Serial No. 364,820.

*To all whom it may concern:*

Be it known that I, ABRAHAM GOTS-DANKER, a citizen of Russia, and a resident of the city of New York, borough of Brooklyn, county of Kings, and State of New York, have invented a new and Improved Watchmaker's Compound Lathe Chuck, of which the following is a full, clear, and exact description.

This invention relates to attachments for lathes, and has reference more particularly to a chuck for a watchmaker's lathe in which work is clamped in a plate which is separable from the chuck proper.

An object of this invention is to provide a device of the class indicated which will hold fine pieces of work securely.

Another object of this invention is to provide a watchmaker's lathe chuck in which the work is held securely in a clamping plate which in turn is clamped between the jaws of the chuck so that a larger portion of the work may be placed inside the chuck while the smaller portion of the work is on the outside of the chuck in a position convenient for the turning operations.

Reference is to be had to the accompanying drawing forming a part of this specification in which it is understood that the drawing illustrates only one example of the invention with certain modifications and in which—

Figure 1 is an elevation of the improved lathe chuck.

Figure 2 is an end view of the lathe chuck with the clamping plate removed.

Figure 3 is an end view of the lathe chuck with the clamping plate in place.

Figure 4 is a section on the line 4—4 of Figure 3.

Figure 5 is an elevation of the clamping plate removed from the chuck.

Figure 6 is an elevation of a modified form of the clamping plate.

Figure 7 is a section on the line 7—7 of Fig. 6.

Figure 8 is a second modification of the clamping plate, which is secured to a cup adapted to fit in the chuck.

Figure 9 is a side elevation of the plate shown in Figure 8.

Referring to the accompanying drawing by numerals, 10 indicates the cylindrical stem of a watchmaker's chuck which is provided on one end with a section 11 smaller in diameter than the stem 10, and being provided with external threads 12 which are adapted to fit in any standard lathe head not shown. The end of the stem 10 opposite the threads 12, is provided with a frusto-conical section 13 which is adapted to engage a similar internal frusto-conical surface on the lathe head shown in Fig. 4, for a purpose to be hereinafter described. The end of the stem 10 beyond the frusto-conical section 13 terminates in a cup 14 which is also cylindrical. The stem 10, the frusto-conical section 13, and the cup 14 are divided into a plurality of sectors, preferably three in number, by means of slots 15 formed therein, said slots being parallel to the axis of the stem 10, and extending to within a short distance of the section 11 of the stem 10. An annular groove 16 is formed on the inside end of the cup 14 so that an oblique annular shoulder 17 is provided which is adapted to engage a circular disc 18 having substantially the same diameter as said shoulder. This plate 18 is thin and is stamped with a series of perforated designs 19 which follow generally the radial direction of the three slots in the cup 14. These perforations 19 converge in a hole 20 in the center of the plate 18 so that when said plate is pressed together it will have a spongy character, and the edges of the hole 20 will grip any piece of work 21. When the section 11 is screwed into the lathe head, the frusto-conical surfaces 13 will engage the similar surfaces on the lathe head so that the sectors of the cup 14 will be forced together and the oblique shoulder 17 will compress the plate 18 and cause the edges of the hole 20 to securely grip the work 21.

It is desirable to have the inside point 22 of the work 21 accurately centered, and for this purpose a tube 23 is accurately fitted to the inside of the section 11 and gradually tapers off until the section of said tube adjacent the cup 14 has an outside diameter considerably smaller than the section of the tube 23 adjacent the threads 12, so that said tube will not interfere with the contraction of the cup 14. A spindle 24 is slidably fitted to the inside of the tube 23 and is provided at one end with a frusto-conical section 25 which terminates in a cup-like depression 26 which is adapted to receive the point 22 of the work 21. This spindle 24 is co-axial with the cup 14 and is adapted to hold the point 22 of the work 21 accurately centered. The end of the tube 23 opposite the cup 14 is closed with a head 27 and a pin 28 smaller in diameter than the spindle 24, and secured to said spindle, passes through the head 27 and extends beyond in order to be easily grasped by the hand so as to move the spindle 24 axially against the action of a spring 29 when putting the work 21 in place. This spring 29 surrounds the pin 28 and is adapted to provide a continuous pressure of the spindle 24 against the point 22 of the work 21, so as to always maintain said work accurately centered. The tube 23 should be secured inside the stem 10 by any suitable means such as solder 30. In order to observe the work 21 on the inside of the cup 14, a plurality of openings 31 are provided in said cup, preferably one opening in each sector. Thus it is seen that the portion of the work 21 which is larger in diameter, may be placed on the inside of the cup 14, while an outer point 32 is in position on the outside of the cup 14 so that it may be trued up or may be machined in any other desired manner.

In the modified plate $18^a$ shown in Figures 6, and 7, a plurality of perforations $19_a$ are provided which are somewhat different in shape than the perforations 19 but serve a similar purpose. The central portion of the plate $18_a$ has an offset $32_a$ which is provided with a hole $20_a$ adapted to grip the work. This type of plate is especially adapted for use on small pieces of work.

In the modification shown in Figures 8 and 9 a plate $18_b$ is secured to a bottomless cup 33, said plate and said cup being provided with slots $15_b$. The cup 33 is adapted to fit into the inside of the cup 14 so that when said cup 14 is compressed around the cup 33, any extremely fine piece of work held by the plate $18_b$ will be absolutely prevented from getting out of alignment since the cup 33 will prevent any slight shifting of the plate $18_b$.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim as new and desire to secure by Letters Patent:

A watchmaker's chuck comprising a tubular member having one of its ends enlarged and hollow, said tubular member being longitudinally split to permit of contraction thereof, a tubular member adapted to be inserted within the first-mentioned tubular member and permanently secured therein, a work-centering member slidably mounted in the second-mentioned tubular member, a spring interposed between the inner end of said work-centering member and the end wall of the tubular member, a radially compressible disk adapted to engage the work in such a manner as to permit of engagement of the work with the work-centering member, and means for contracting the enlarged hollow portion of the first-mentioned tubular member to retain the work in position in engagement with the centering member, substantially as described.

ABRAHAM GOTSDANKER.